United States Patent
Della Vedova et al.

(10) Patent No.: US 10,234,204 B2
(45) Date of Patent: Mar. 19, 2019

(54) METHOD FOR MANAGING THE CHARGE IN A MELTING FURNACE AND CORRESPONDING LOADING APPARATUS

(71) Applicant: DANIELI AUTOMATION SPA, Buttrio (IT)

(72) Inventors: Ferruccio Della Vedova, Pozzuolo del Friuli (IT); Lorenzo Ciani, Udine (IT)

( * ) Notice: Subject to any disclaimer, the term of this patent is extended or adjusted under 35 U.S.C. 154(b) by 846 days.

(21) Appl. No.: 14/373,981

(22) PCT Filed: Jan. 23, 2013

(86) PCT No.: PCT/IB2013/000070
§ 371 (c)(1),
(2) Date: Jul. 23, 2014

(87) PCT Pub. No.: WO2013/110993
PCT Pub. Date: Aug. 1, 2013

(65) Prior Publication Data
US 2015/0030049 A1    Jan. 29, 2015

(30) Foreign Application Priority Data
Jan. 23, 2012 (IT) .............................. UD2012A0009

(51) Int. Cl.
*F27D 3/00* (2006.01)
*C21C 5/52* (2006.01)
(Continued)

(52) U.S. Cl.
CPC ............ *F27D 3/0025* (2013.01); *C21C 5/527* (2013.01); *F27B 3/18* (2013.01); *F27D 3/0024* (2013.01);
(Continued)

(58) Field of Classification Search
CPC .......... C21C 5/527; C21C 5/4673; C21C 5/30; F27B 3/18; F27B 3/183; F27D 3/0024;
(Continued)

(56) References Cited

U.S. PATENT DOCUMENTS 3,622,141 A    11/1971  Brusa
4,063,820 A    12/1977  Borgese
(Continued)

FOREIGN PATENT DOCUMENTS

CH          690109 A5     4/2000
WO    2000050648 A1      8/2000
(Continued)

OTHER PUBLICATIONS

Office Action from U.S. Appl. No. 14/369,877 dated Oct. 5, 2015.
(Continued)

*Primary Examiner* — Hung D Nguyen
(74) *Attorney, Agent, or Firm* — Calfee, Halter & Griswold LLP

(57) ABSTRACT

Method for managing the metal charge in a melting furnace includes at least a step of depositing metal materials to be melted in a storage zone, a step of picking up and loading the metal materials from the storage zone onto feeding device by loading device, and a feed step in which the feeding device feeds the materials toward the melting furnace. The deposit step provides to divide the storage zone into a plurality of specialized areas in each of which a differentiated type of the metal materials is deposited, and during the pick-up and loading step, a processing device controls and commands the actuation of the feeding device which picks up the types of materials from the specialized areas and load them onto the feeding device according to a desired modality and quantity.

19 Claims, 2 Drawing Sheets

(51) Int. Cl.
*F27B 3/18* (2006.01)
*F27D 13/00* (2006.01)
*F27D 11/08* (2006.01)

(52) U.S. Cl.
CPC ............ *F27D 11/08* (2013.01); *F27D 13/002* (2013.01); *Y02P 10/216* (2015.11)

(58) Field of Classification Search
CPC ........ F27D 3/0025; F27D 3/18; F27D 13/002; F27D 11/08; Y02P 10/216
USPC ........ 373/79, 80, 81, 85, 115, 142; 266/216, 266/47, 80, 225; 75/375, 10.46, 10.62, 75/387, 10.12
See application file for complete search history.

(56) References Cited

U.S. PATENT DOCUMENTS

| | | | |
|---|---|---|---|
| 4,402,083 A * | 8/1983 | Paskarbeit | ............. C21C 5/527 373/79 |
| 4,775,134 A | 10/1988 | Patuzzi et al. | |
| 4,938,866 A | 7/1990 | Ward | |
| 5,948,137 A * | 9/1999 | Pflaum | ................. C21C 5/4673 266/80 |
| 6,004,504 A | 12/1999 | Vallomy | |
| 6,024,912 A * | 2/2000 | Wunsche | ................ C21C 5/565 373/80 |
| 2013/0211581 A1 | 8/2013 | Assante | |

FOREIGN PATENT DOCUMENTS

| | | |
|---|---|---|
| WO | 2003095685 A1 | 11/2003 |
| WO | 2012023029 A1 | 2/2012 |

OTHER PUBLICATIONS

Manenti A A "From Blast Furnace to EAF: The Technology for the Conversion From Integrated Producer to High-Quality Electric Minimill" Iron & Steel Technology, AIST, Warrendale, PA, US, vol. 1, No. 7, pp. 1228-128, Jul. 1, 2004.
International Search Report and Written Opinion from PCT/IB2012/002806 dated May 6, 2013.
Argenta P et al, "Electric Arc Furnace Technology Breaks Record," Elektrolichtbogenofentechni K Mit Neuem Kapazitaetsrekord, Stahl Und Eisen, Verlag Stahleisen, Dusseldorf, DE, vol. 125, No. 2, Feb. 15, 2005.
International Search Report From PCT/IB2013/000070 dated Apr. 2, 2013.

* cited by examiner

METHOD FOR MANAGING THE CHARGE IN A MELTING FURNACE AND CORRESPONDING LOADING APPARATUS

CROSS-REFERENCE TO RELATED APPLICATION

This application is the U.S. national phase entry of PCT/IB2013/000070, with an international filing date of 23 Jan. 2013, which claims the benefit of Italian Application Serial No. UD2012A000009, with a filing date of 23 Jan. 2012, the entire disclosures of which are fully incorporated herein by reference.

FIELD OF THE INVENTION

The present invention concerns a method for managing the metal charge which is introduced into a melting furnace, for example of the electric arc type, and the corresponding loading apparatus for the metal material.

The metal charge mainly consists of undifferentiated scrap which is replenished on each occasion with metal material selected to obtain a desired final composition of the steel.

The invention advantageously concerns the management of the charge which is introduced into the furnace through a specific aperture made in the furnace itself.

BACKGROUND OF THE INVENTION

It is known that the procedure for introducing the metal charge into a furnace, after tapping and in relation to any possible remaining liquid heel, provides a sequence of progressive steps of introducing the material to be melted: the sequence is carried out and commanded, in most cases, by the workers responsible.

Therefore, for example, it may be provided that the workers command on each occasion the introduction in sequence into the furnace firstly of cast iron slabs, then low-value scrap possibly mixed with other types of scrap, and then higher value scrap and finally another charge of cast iron slabs.

The types of materials introduced depend on the type of steel to be obtained, and the sequence in which the materials are introduced is determined by the melting process to be carried out.

It is also known that the furnace may be loaded using continuous scrap conveyors, which cooperate with a specific hole in the roof or panel of the furnace.

It is also known that, during the melting process, the hole can be closed or kept open, and that the fumes exiting from the furnace can be made to flow above and/or between the scrap that is on stand-by or in a transport step. In this way the fumes are purified and at the same time the scrap is heated When the scrap is transported by conveyor belts or vibrating conveyors, these normally extend from the electric arc furnace at least as far as a warehouse, normally two, where piles of scrap, different in type and/or size, are disposed.

Normally, one or more cranes per warehouse serve the continuous transporter that feeds the melting furnace in order to load the scrap in the desired sequence and quantities.

Specialized personnel control and command the cranes to pick up and deposit the materials according to the desired type and sequence.

It is known that, in the case of continuous transporters, the charges deposited on the transporter must not exceed a certain bulk and must not leave interspaces free between one charge and the other.

The bulk is characteristic of the loading hole or mouth in the furnace.

The continuity of the charge is advantageous for energy saving and loading time.

It is also known that the cranes pick up the charge material from the piles normally with magnets or octopus grabs, to then load it onto the transporters.

In relation to the solutions for loading furnaces known in the state of the art, one purpose of the present invention is to control the continuity of the charge in transit on the continuous transporters.

It is also a connected purpose to control the composition of the charge to obtain, at the end of the melting process, a metal product with desired properties.

It is also a connected purpose to control and manage the areas used for depositing the specific materials that are used for the various types of charge.

It is a derived purpose to coordinate and manage everything according to predefined and controlled work programs.

It is also a purpose of the present invention to perfect a method for managing the metal charge in a melting furnace that limits, possibly eliminates, the interventions of specialized personnel in controlling and commanding the cranes and continuous transporters.

SUMMARY OF THE INVENTION

The main purposes and advantages described above are obtained by a method to manage the charge in furnaces and by a corresponding loading apparatus according to the independent claims. The dependent claims describe other characteristics of the invention.

According to the invention, one or more deposit zones, for example portions of warehouses, are each designated for the storage of various charge materials, differentiated from each other. Each deposit zone is divided into specialized areas, each of which is in turn coded depending on the type of materials that are to be positioned there.

Here and hereafter in the description and the claims, by type of material we mean material with homogeneous characteristics dictated for example by the origin of the metal material, its composition, the levels of impurities or pollutants present. For example metal materials may be provided consisting of low-value scrap, higher-value scrap, cast iron slabs or other types.

According to a variant, at least the main specialized areas are assisted by detection devices that control, either continuously or periodically, the volume and/or the disposition of the material present in said zone. In particular, the detection devices are suitable to detect the volumetric profile of the pile of metal materials that are disposed in the specialized areas, and the data that is sent to the processing device allow to prevent collisions between the loading means and the metal materials, for example by commanding the charge to be lifted or by circumventing the obstacle.

It is therefore possible to keep the quantity of material present constantly monitored, so as to make replenishments if necessary.

It is in the spirit of the invention to provide that the loading apparatus comprises a data processing device, complete with specific memories, which controls and manages at least the specific specialized deposit areas relating to the most widely used materials to perform the functions required and correlated to the progress of the melting process.

It is in the spirit of the invention to provide that the loading apparatus comprises a plurality of loading means, for example gantries, cranes and pick-up equipment such as octopus grabs, magnets or other similar means, or which perform the same function, to load the metal materials onto feed means, for example, a conveyor that conveys the metal material toward the melting furnace.

In other embodiments it may also be provided that the feed means comprise a basket or other similar container, which is loaded with a defined sequence with metal material, which is subsequently unloaded into the melting furnace.

The functioning of the loading means present in at least one warehouse is governed and controlled directly by the data processing device according to the specific charge that has to be prepared in order to obtain the final product.

According to another variant of the present invention, the processing device provides to optimize the trajectories of movement of the loading means, in order to reduce the movement times.

The optimized trajectories of the loading means allow for example to prevent any impact thereof against piles of materials present in the specialized areas, and against possible apparatuses or other obstacles that could be present; they also allow to reduce the travels thereof, to identify from which specialized area to pick up the material, depending on the reduction in travels and the management requirements connected to the deposit space.

In other embodiments, moreover, the processing device also determines the laws of motion, such as the speed profiles or accelerations, to be assigned to the drive members of the movement means in order to start them, and the braking steps in order to prevent oscillations of the suspended loads that are transported.

According to one embodiment of the present invention, sensors to detect the quantity of material, for example the volume and weight, that is picked up on each occasion from the specialized areas, are associated with the loading means.

In this way it is possible to accurately determine the quantity of each type of material that will feed the melting furnace.

The data detected by the sensors are suitably processed by the processing device.

According to a variant of the present invention in the gantries are present possible proximity devices which operate both toward the other gantries and also toward the structures of the warehouse and possibly the charge reception means, in order to determine their position instantaneously, to prevent problems of interference with other gantries, or to determine end-of-travel conditions.

A variant of the present invention provides that the data processing device of the loading apparatus interacts directly, and in a two-directional manner, with another data processing device which governs and controls the melting process of the metal charge in the time range comprised between the start of one cycle and the start of the subsequent cycle.

The other processing device mentioned above may comprise a first processor and a second processor that control and manage the functioning respectively of the melting furnace and of the conveyor.

With the method according to the present invention it is therefore possible to control and manage, in a point-by-point and reproducible manner, the melting process and the final properties of the metal product to be obtained.

Furthermore, in this case the intervention of specialized personnel is no longer required to provide for the movements and to perform the operations of loading the material in a suitable manner.

It must also be pointed out that the invention also provides a feedback of information so that the data processing device of the loading apparatus memorizes and updates the individual databases, also identifying errors or other.

DESCRIPTION OF THE DRAWINGS

These and other characteristics of the present invention will become apparent from the following description of one form of embodiment, given as a non-restrictive example with reference to the attached drawings wherein.

DESCRIPTION OF ONE FORM OF EMBODIMENT

Figure 1:
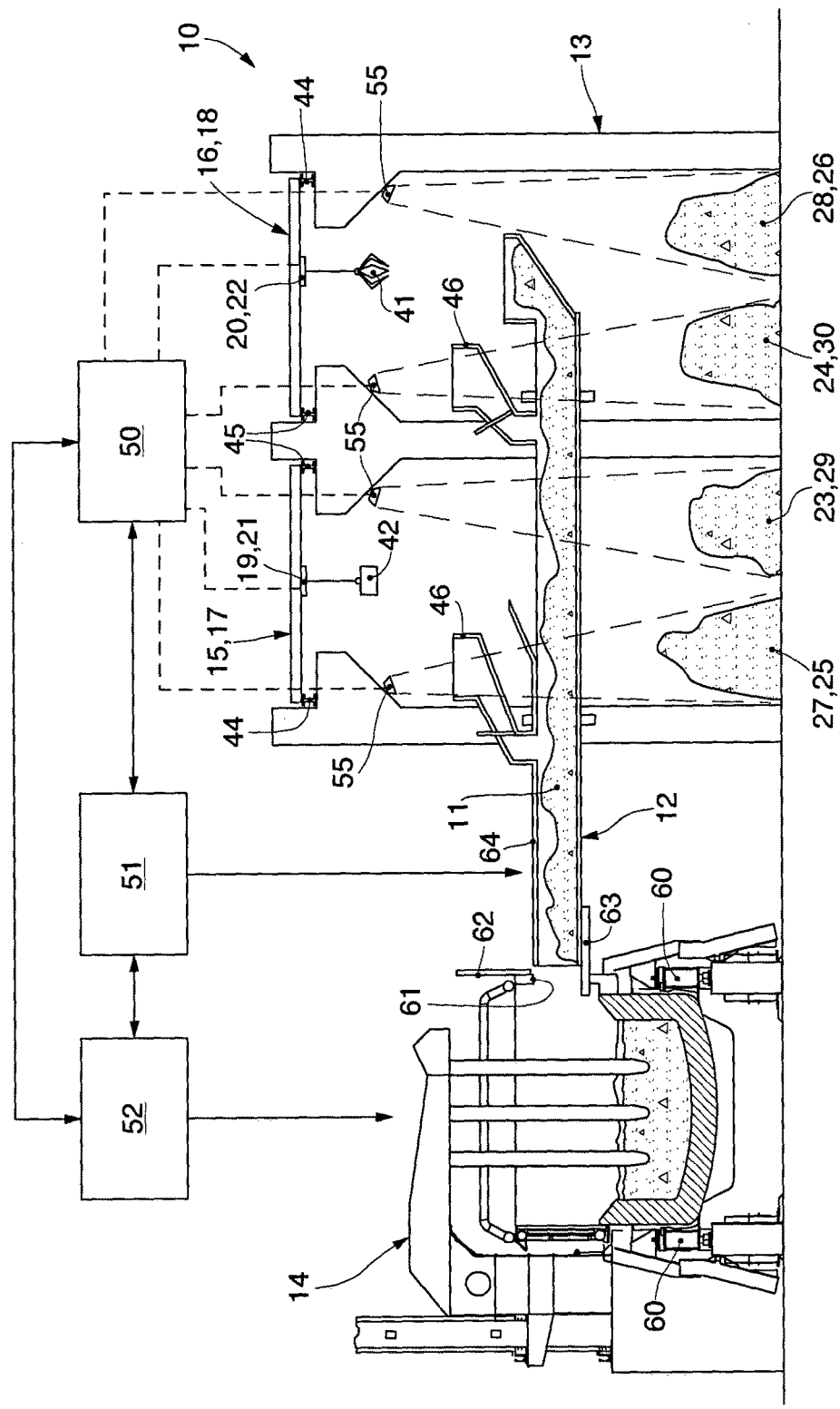
FIG. 1 is a schematic representation of a front view of an apparatus for loading metal material to a melting furnace according to the present invention.
Figure 2:
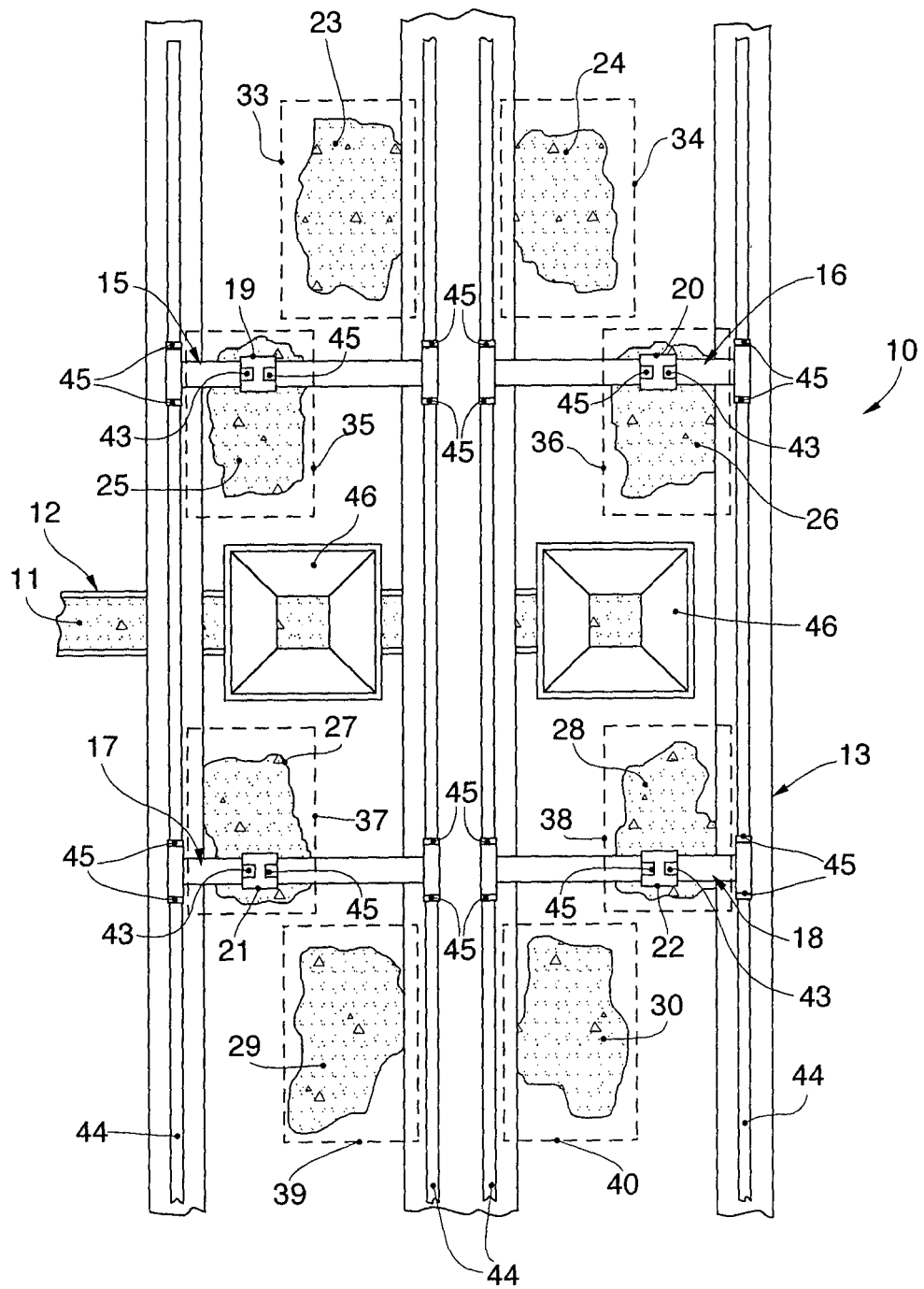
FIG. 2 is a plan schematic representation of FIG. 1.

With reference to the attached drawings, an apparatus for loading metal material according to the present invention is indicated in its entirety by the reference number 10 and is provided to manage and control the loading of a metal charge 11 onto feed means, in this case a continuous conveyor 12 that feeds in turn a melting furnace, in this case an electric arc furnace 14.

In other embodiments, the feed means can comprise containing elements, such as baskets for containing scrap, which are filled with the metal materials that are subsequently unloaded into the electric furnace 14.

The loading apparatus 10 according to the present invention comprises a plurality of loading means which provide to pick up metal material from a storage zone, in this case a warehouse 13, to make it available to the conveyor 12.

In this case, the feed means comprise four gantries 15, 16, 17, 18 operating in two compartments of the warehouse 13 and on each of which a crane 19, 20, 21, 22 is mounted.

In the two compartments of the warehouse 13 a plurality of piles of scrap or charge materials are disposed. The piles of scrap each consist of a well-defined type of material, indicated respectively by the reference numbers 23, 24, 25, 26, 27, 28, 29, 30. The types of materials 23-30 are each positioned in specialized areas indicated respectively as 33, 34, 35, 36, 37, 38, 39, 40, so that to each specialized area 33-40 corresponds one of the types of materials 23-30.

The specialized areas 33-40 are disposed inside the maneuvering space of the gantries 15-18.

The cranes 19-22 are equipped with octopus grabs 41 or magnets 42, or both, according to the functions that they have to perform and the types of materials 23-30 they have to pick-up.

The gantries 15-18 are mounted, traditionally, sliding on longitudinal guides 44.

More specifically the cranes 19-22 provide to unload the types of materials 23-30 into the conveyor 12 through loading hoppers 46 associated with the conveyor 12.

Both the gantries 15-18 and the cranes 19-22 are provided with proximity devices 45 which allow to detect the proximity of obstacles, such as the end of the guides 44, another gantry or suchlike.

The loading apparatus 10 is provided with a processing device 50 that controls and commands the drive members of the gantries 15-18, the cranes 19-22, the octopus grabs 41 and the magnets 42.

In some embodiments it may be provided that the octopus grabs 41 and the magnets 42 are also provided with sensors 43 suitable to detect the quantity and/or possibly the weight of the metal material they pick up. The sensors in this case send signals to the processing device 50 to control the quantity that has been loaded into the conveyor 12.

The processing device 50 also receives the signals sent by the proximity devices 45 to control and manage the different movements and actions on the drive members.

The processing device 50 also interacts with a first processor 51 and a second processor 52, which control and coordinate the actions/processes respectively of the conveyor 12 and the electric furnace 14.

In this way, the processing device 50 is able to control and command the movement of gantries 15-18, cranes 19-22, octopus grabs 41, and magnets 42 also in relation to the conditions of the electric furnace 14 and the conveyor 12, as dictated by the requirements of the melting process.

According to the present invention, the processing device 50 is also provided with detection devices 55 to detect the quantity of material present in each specialized area 33-40.

In particular, the detection devices 55 detect the quantity of residual material, either continuously or at regular intervals, or possibly after the type of material 23-30 has been picked up from the specialized area 33-40.

The detection devices 55 not only determine the quantity of material present in each of the specialized areas 33-40, but also detect what their height is with respect to the ground.

This detection of the height of the piles of metal material present in the specialized areas 33-40 allows to optimize the travels of the gantries 15-18 and cranes 19-22, to prevent the octopus grabs 41 and magnets 42 from knocking against the piles.

According to another embodiment of the invention, instead of being allocated to fixed parts of the warehouse 13 as shown in FIG. 1, the detection devices 55 are located directly on the gantries 15-18. In this case, during the movements of the gantries 15-18, the detection devices 55 detect the quantities and volumetric profiles, that is, the heights of the piles of material present in the specialized areas 33-40. This also allows to reduce the number of detection devices that must be present in the warehouse 13 for the required operations.

Depending on the information provided by the detection devices 55, the processing device 50 supplies the operator with the information concerning the quantity of metal material present, and provides possible replenishments that might be necessary.

The detection devices 55 may comprise, by way of example, laser brush sensors, camera sensors, X-ray sensors or similar.

The electric furnace 14 has an eccentric casting hole and is moved by one or more jacks 60. The electric furnace 14 has a mouth 61 to introduce the metal charge 11, which is at least partly and selectively closable by closing means 62.

The metal charge 11 is sent by the conveyor 12 toward the mouth 61 and unloaded into the electric furnace 14 thanks to a retractable extension 63 so as not to interfere with the closing means 62.

In the case shown here, the conveyor 12, advantageously the vibrating type, has a cover 64 that allows to pre-heat the metal charge 11 with the fumes of the electric furnace 14.

The method for managing the metal charge 11 in the electric furnace 14 comprises at least a step of loading the conveyor 12 and a step of detecting the quantity of metal material present in the specialized areas 33-40.

The loading step provides a plurality of substeps during which one or more of the cranes 19-22 are suitably moved, as a function of the information supplied by the processing device 50, to pick up from a desired specialized area 33-40 a determinate type of material 23-30.

The types of materials 23-30 are picked up and loaded continuously on the conveyor 12 in relation to the final metallurgical properties of the product to be obtained at the end of the melting process, and in relation to an optimization of the energy consumption required to start the melting process.

The movement trajectories of the gantries 15-18, the cranes 19-22, the octopus grabs 41 and the magnets 42 are suitably optimized by the processing device 50 to prevent them from knocking against fixed parts such as for example the conveyor 12, the hoppers 46 or the piles of metal material. This operation also allows to reduce the movement times of the loading means with a consequent increase in the efficiency of the plant.

Furthermore, the processing device 50 can define laws of motion that are imparted to the drive members associated to the gantries 15-18, the cranes 19-22, the octopus grabs 41 and the magnets 42. In particular, the processing device 50 can define laws to vary the speed and accelerations imparted to the loading means for example during start-up and braking of the gantries 15-18 and the cranes 19-22. The laws to vary the speed and accelerations can also be studied so as to prevent oscillations of the octopus grabs 41 and/or the magnets 42 due to and influenced by the entity of the suspended load that they are transporting. This allows to speed up the operations of loading the metal materials into the hoppers 46.

In order to optimize the trajectories and determine laws to vary the speed and accelerations, as explained above, the processing device 50 receives signals both from the sensors 43 and also from the proximity devices 45 and the detection devices 55.

The gantries 15-18 are suitably moved continuously so as to obtain an equal distribution of the metal charge 11 inside the conveyor 12.

The second processor 52 supplies indications to the processing device 50 concerning the state of progress of the melting and casting process of the metal material in the electric furnace 14.

During melting and/or casting, the processing device 50 commands the movement of the cranes 19-22, so that they unload the types of materials 23-30 into the hopper 46 of the conveyor 12.

The first processor 51 provides to feed forward the metal charge 11 in the conveyor 12 so as to subsequently unload it into the electric furnace 14.

The feed of the metal charge 11 allows to distribute the latter equally and uniformly inside the conveyor 12.

For this purpose the reciprocal interaction of the processing device 50, the first processor 51 and the second processor 52 is indispensable.

It is clear that modifications and/or additions of parts may be made to the loading apparatus 10 as described heretofore, without departing from the field and scope of the present invention.

The invention claimed is:

1. An apparatus for managing a metal charge in a melting furnace, comprising:
   a transport conveyor in communication with the melting furnace,
   a storage zone having a plurality of storage areas, wherein each storage area stores a single type of metal charges, different storage areas store different types of metal charges, wherein the types of the metal charges comprise at least one of low value scrap, high value scrap, or cast iron slabs, a plurality of loading devices, each configured to pick up the metal charges from the associated storage areas, to move along at least a portion of the conveyor, and to discharge the picked metal charges onto the conveyor, and a control system in communication with the storage zone and the loading devices, wherein the control system is configured to activate the loading devices to selectively load the metal charge from the storage areas of the storage zone onto the conveyor based on the type of the metal charge.

2. The apparatus of claim 1 wherein each of the storage areas has a distinct code to associate with the control system.

3. The apparatus of claim 1 further comprising a detection device to detect a quantity or volumetric profile of the metal charge in a storage area.

4. The apparatus of claim 3 wherein the detection device further comprises a laser brush sensor, a camera sensor, or an X-ray sensor.

5. The apparatus of claim 3 wherein the control system controls the loading devices based on the volumetric profile of the metal charge in a storage area, such that the loading devices do not knock against the metal charge.

6. The apparatus of claim 3 wherein the detection device is configured stationarily in the storage zone, or configured to be movable with the loading devices.

7. The apparatus of claim 1 further comprising a proximity device in communication with the control system to control a movement and a position of the loading device, wherein the control system manages trajectories of the loading devices to prevent interferences between the loading devices.

8. The apparatus of claim 1 wherein the loading device further comprises a gantry, a crane, and a pick-up equipment.

9. The apparatus of claim 8 further comprising a sensor to detect a quantity of the metal charge picked up by the pick-up equipment.

10. The apparatus of claim 1 wherein the loading devices are provided with proximity devices which detect the proximity of obstacles, wherein the control system controls and manages the movements and actions of the loading devices based on the proximity of obstacles.

11. A method for managing a metal charge in a melting furnace, comprising:

depositing different types of metal charges in respective areas of a storage zone, wherein the types of the metal charges comprise at least one of low value scrap, high value scrap, or cast iron slabs, each area stores a single type of the metal charges, selectively and movably loading the metal charge, by a plurality of loading devices, from the associated areas of the storage zone onto a conveyor based on the type of the metal charge in the storage area, and continuously transporting the metal charge into the melting furnace via the conveyor.

12. The method of claim 11 further comprising codifying the areas based on the type of the metal charge within the storage areas.

13. The method of claim 12 further comprising determining the quantity of the metal charge picked up by the pick-up equipment.

14. The method of claim 11 further comprising detecting a quantity or volumetric profile of the metal charge in the areas.

15. The method of claim 14 further comprising controlling the loading devices based on the volumetric profile of the metal charge, such that the loading devices do not knock against the metal charge.

16. The method of claim 14 further comprising replenishing the metal charge based on the quantity of the metal charge.

17. The method of claim 11 wherein the loading devices comprise a gantry, a crane, or a pick-up equipment.

18. The method of claim 11 further comprising determining the motion laws of the loading devices, and managing trajectories of the loading devices to prevent interferences between the loading devices.

19. The method of claim 11 further comprising detecting the proximity of obstacles, and controlling and managing the movements and actions of the loading devices based on the proximity of obstacles.

* * * * *